UNITED STATES PATENT OFFICE.

EARL BLOUGH AND THOMAS McINTOSH, OF PITTSBURGH, PENNSYLVANIA, ASSIGNORS TO ALUMINUM COMPANY OF AMERICA, OF PITTSBURGH, PENNSYLVANIA, A CORPORATION OF NEW JERSEY.

PRODUCTION OF ALUMINA AND POTASSIUM SULFATE FROM ALUNITE.

1,214,991. Specification of Letters Patent. Patented Feb. 6, 1917.

No Drawing. Application filed February 1, 1916. Serial No. 75,490.

*To all whom it may concern:*

Be it known that we, EARL BLOUGH and THOMAS McINTOSH, both citizens of the United States, residing at Pittsburgh, in the county of Allegheny and State of Pennsylvania, have invented certain new and useful Improvements in the Production of Alumina and Potassium Sulfate from Alunite, of which the following is a full, clear, and exact description.

Our invention relates to treatment of the mineral commonly known as alum stone or alunite, particularly for the production of alumina and potassium sulfate. The composition of this mineral varies somewhat, but it usually contains alumina, sulfuric acid anhydrid, potash, silica, iron oxid and water. The invention has as an advantage the production of valuable by-products, such as sulfuric acid and hydrochloric acid, and, if desired, caustic soda or carbonate of soda, or both.

In the past various attempts have been made to utilize alunite, chiefly, however, for the production of potassium alum. Some efforts, more or less successful, have been made to separate the potassium constituent from alunite and to secure as by-products alumina and sulfuric acid. Our invention is an improvement upon other attempts to utilize this mineral, in that it not only affords an effective means of separating the potassium salt and alumina, but may also give in addition valuable by-products by comparatively simple chemical processes.

The process as we carry it out in the preferred manner can be described substantially as follows: The alunite is finely ground and carefully mixed with common salt, the quantity of the latter being sufficient to react with the aluminum sulfate present as determined by analysis. After the two ingredients are well ground and thoroughly mixed they are roasted or sintered in any suitable furnace whereby more or less of the aluminum sulfate is decomposed, leaving a residue composed chiefly of insoluble alumina and a water-soluble mixture of sodium sulfate and potassium sulfate. As the process is carried out, hydrochloric acid gas, liberated from the salt, commences to be evolved at a low heat, and it is not necessary that extreme temperatures be employed to complete the reaction. In fact, a temperature of 800 degrees centigrade is usually ample. It should not, however, be high enough to cause sodium or potassium oxids to combine with the alumina present, which would produce soluble aluminates. In operating the process on a commercial scale the hydrochloric acid gas may be condensed in any suitable and convenient system of concentrating apparatus.

The sintered mass or residue resulting from the furnace treatment is treated with water whereby the sulfates of sodium and potassium are dissolved, leaving as an insoluble residue alumina and such impurities as naturally occur in the alunite, as for examble, silica, iron oxid, etc. The potassium sulfate may be separated from the sodium sulfate by any well-known method. Among these methods the preferred one is the well-understood method of crystallization based on difference in the solubilities of the two alkali metal sulfates in water. After the potassium sulfate has thus been separated by crystallization it is dried and is then ready for the market, with or without further purification, as desired. The sodium sulfate obtained by the separation above described, and first preferably somewhat concentrated, is intimately mixed with the residue obtained from dissolving out the sulfates and is roasted (at a temperature which need not, in general, exceed 1500 degrees centigrade,) whereby the sodium sulfate is broken down forming volatile sulfurous and sulfuric acid gases and leaving a residue containing water-soluble sodium aluminate and insoluble impurities. The residue resulting from this furnace treatment is now with water, preferably digested, and is filtered from insoluble impurities. The alumina can then be precipitated from the sodium aluminate solution in any convenient way, as for example, by the Bayer method or the Fickes method, or by means of carbonic acid, or by a combination of methods. The alkali obtained after the precipitation of the alumina is in the form of caustic soda or carbonate of soda, depending upon the method chosen for the precipitation, as will be readily understood.

The acid gases evolved from roasting the residue with sodium sulfate are condensed in any suitable and convenient apparatus for the purpose.

It is to be understood that the invention is not limited to the procedure herein specifically described but is susceptible of various modifications, without departure from its spirit.

We claim:

1. The process of treating alunite, comprising mixing the alunite with common salt, heating the mixture whereby the salt is decomposed, dissolving out sodium sulfate and potassium sulfate from the reaction product separating the latter sulfate from the solution, heating together sodium sulfate thus obtained and the residue from the solution, whereby the sodium sulfate is broken up, and from the residue of the latter heating dissolving out alumina as sodium aluminate.

2. The process of treating alunite for the purpose described, comprising mixing together finely divided alunite and common salt, sintering the mixture to decompose the salt with evolution of hydrochloric acid gas, dissolving out sodium sulfate and potassium sulfate from the sinter, recovering the potassium sulfate from the solution, mixing and heating sodium sulfate thus obtained and the residue left from dissolving out the sulfates mentioned whereby the sodium sulfate is decomposed and sulfur oxids are evolved, collecting the later, and treating the residue of the last-mentioned heating with water to dissolve out alumina as sodium aluminate.

3. In a process of treating alunite, the steps comprising mixing the alunite with common salt, heating the mixture whereby the salt is broken up and sodium and potassium sulfate formed, and dissolving out sodium sulfate and potassium sulfate from the solid residue.

4. The process of treating alunite, comprising heating the same with an alkali-metal chlorid sufficiently to decompose the latter, leaching from the reaction product the soluble alkali-metal sulfates contained therein, heating the leached residue with an alkali-metal sulfate to form a soluble alkali-metal aluminate, and dissolving out the latter.

In testimony whereof we hereunto affix our signatures.

EARL BLOUGH.
THOMAS McINTOSH.